United States Patent
Brown et al.

(10) Patent No.: US 12,434,253 B2
(45) Date of Patent: Oct. 7, 2025

(54) SPRAY COATING APPARATUSES WITH TURN NOZZLE ASSEMBLIES AND METHODS OF COATING GLASS OBJECTS

(71) Applicant: CORNING INCORPORATED, Corning, NY (US)

(72) Inventors: James Michael Brown, Elmira, NY (US); Brian Charles Cook, Elkland, PA (US); Daniel Warren Hawtof, Milton, DE (US); Purushotam Kumar, Corning, NY (US); Sean Thomas Miller, Elmira, NY (US); Bruce Arthur Mourhess, Jr., Campbell, NY (US); Elias Panides, Horseheads, NY (US); James Westley Rogacki, Franklinville, NY (US); John Stone, III, Painted Post, NY (US); Yujian Sun, Painted Post, NY (US); Leo Young Zheng, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 113 days.

(21) Appl. No.: 18/072,104

(22) Filed: Nov. 30, 2022

(65) Prior Publication Data
US 2023/0173514 A1     Jun. 8, 2023

Related U.S. Application Data

(60) Provisional application No. 63/287,159, filed on Dec. 8, 2021.

(51) Int. Cl.
*B05B 7/08*    (2006.01)
*B05B 13/02*   (2006.01)
(Continued)

(52) U.S. Cl.
CPC ........ *B05B 7/0815* (2013.01); *B05B 13/0228* (2013.01); *C03C 17/005* (2013.01);
(Continued)

(58) Field of Classification Search
USPC .................................. 118/313, 315, 326, 300
See application file for complete search history.

(56) References Cited

U.S. PATENT DOCUMENTS 3,819,404 A * 6/1974 Scholes ................. C23C 16/405
                                                        118/729
4,928,624 A * 5/1990 Overton, Jr. ............ B05B 14/48
                                                        118/308

(Continued)

FOREIGN PATENT DOCUMENTS

EP      187515 A  *  7/1986  ............ B05B 13/00
FR      3040006 A1    2/2017
(Continued)

OTHER PUBLICATIONS

International Search Report and Written Opinion of the International Searching Authority; PCT/US2022/050692; mailed on Mar. 13, 2023, 14 pages; European Patent Office.
(Continued)

*Primary Examiner* — Yewebdar T Tadesse
(74) *Attorney, Agent, or Firm* — Michael G. Panian

(57) ABSTRACT

A spray coating apparatus that applies a coating material onto outer surfaces of glass objects includes a coating material source that includes a coating material. A spray nozzle assembly includes a spray nozzle fluidly connected to the coating material source. The spray nozzle is arranged and configured to direct the coating material in a first direction toward the glass object and provide an overspray amount of the coating material by the glass object such that the overspray amount bypasses a non-line of sight area of the
(Continued)

glass object. A turn nozzle assembly includes a turn nozzle fluidly connected to a pressurized gas source. The turn nozzle is arranged and configured to direct pressurized gas in a second direction different than the first direction toward the non-line of sight area of the glass package to redirect the coating material onto the non-line of sight area.

10 Claims, 7 Drawing Sheets

(51) Int. Cl.
 *C03C 17/00* (2006.01)
 *G01N 35/00* (2006.01)
 *G01N 35/04* (2006.01)
(52) U.S. Cl.
 CPC ....... *G01N 35/00732* (2013.01); *G01N 35/04* (2013.01); *C03C 2218/112* (2013.01); *G01N 2035/00752* (2013.01); *G01N 2035/0479* (2013.01)

(56) References Cited

U.S. PATENT DOCUMENTS

| | | | |
|---|---|---|---|
| 6,037,012 A * | 3/2000 | Lourman | C03C 17/005 118/631 |
| 6,264,745 B1 * | 7/2001 | Diaz | B05B 14/43 454/53 |
| 9,034,442 B2 | 5/2015 | Chang et al. | |
| 9,428,302 B2 | 8/2016 | Fadeev et al. | |
| 2002/0046701 A1 * | 4/2002 | Browning | B05B 16/405 118/326 |
| 2004/0009299 A1 | 1/2004 | Damrau | |
| 2013/0171456 A1 | 7/2013 | Fadeev et al. | |
| 2013/0224407 A1 | 8/2013 | Fadeev et al. | |
| 2014/0001076 A1 | 1/2014 | Fadeev et al. | |
| 2014/0001143 A1 | 1/2014 | Fadeev et al. | |
| 2014/0151320 A1 | 6/2014 | Chang et al. | |
| 2014/0151321 A1 | 6/2014 | Chang et al. | |
| 2014/0151370 A1 | 6/2014 | Chang et al. | |
| 2015/0329416 A1 | 11/2015 | Fadeev et al. | |
| 2015/0360999 A1 | 12/2015 | Fadeev et al. | |
| 2017/0333938 A1 * | 11/2017 | Brennan | B65D 65/42 |

FOREIGN PATENT DOCUMENTS

| | | |
|---|---|---|
| JP | 07-024371 A | 1/1995 |
| KR | 10-1141067 B1 | 5/2012 |
| KR | 10-1282287 B1 | 7/2013 |
| WO | 91/12183 A1 | 8/1991 |

OTHER PUBLICATIONS

Weber et al; "Deposition Mechanisms of Thick Lanthanum Zirconate Coatings By Spray Pyrolysis" Journal of the American Ceramic Society, vol. 94, Issue 12, 2011, pp. 4256-4262.

* cited by examiner

SPRAY COATING APPARATUSES WITH TURN NOZZLE ASSEMBLIES AND METHODS OF COATING GLASS OBJECTS

This application claims the benefit of priority to U.S. Provisional Patent Application Ser. No. 63/284,159, filed on Nov. 30, 2021, the content of which is relied upon and incorporated herein by reference in its entirety.

BACKGROUND

Field

The present specification generally relates to spray coating apparatuses and, more particularly, to spray coating apparatuses with turn nozzle assemblies and method of coating glass objects using turn nozzle assemblies.

Technical Background

Historically, glass has been used as the preferred material for packaging pharmaceuticals because of its hermeticity, optical clarity, and excellent chemical durability relative to other materials. Glass packaging for pharmaceuticals can include objects such as vials, cartridges and syringes. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a concern, not just for product quality, but also for the end user. Even non-catastrophic breakage (i.e., when the glass cracks but does not break) may cause the contents to lose their sterility which, in turn, may result in costly product recalls.

It is known to coat the glass with a low coefficient of friction (COF) material. The glass objects may be, for example, dip coated by submerging at least a portion of the glass objects into the low COF material. Dip coating, however, can lead to material waste and variations in product appearance. Conventional spray coating can be difficult due, at least in part, to the coating material being expensive and applied thinly due to cost and functionality, and uniformly for visibility (e.g., to determine amount and color of medicines). Moreover, a thicker application of coating material can render the film of coating material applied more mobile, which can lead to substantial variability in thickness and appearance. These reasons, in combination of the complex shapes of vials, syringes and the like, can make spray coating difficult as the uniformity of the droplets by shape/area is difficult to control repeatably and accurately. Using multiple spray nozzles to account for the different application geometries of the shapes of vials can also bring the issue of overlapping sprays. Overlapping sprays can leave a visible defect from a thickness variation as well as irregular distribution of droplets that coat the surface. Furthermore, different spray times of impact of particles can alter the coverage and appearance of the coatings.

Accordingly, a need exists for spray coating apparatuses with turn nozzle assemblies and methods of coating glass objects using turn nozzle assemblies. The turn nozzle assemblies can utilize a single distribution of droplets from a single atomizer (an airless sprayer for example) can be modified by an air turn to keep the benefits of a droplet distribution designed for a particular portion of the vial geometry (like a side wall) and utilize the portion that is designed to "miss" the vial to redirect it to another direction to coat surfaces that are not directly accessible to the spray nozzle such as the heel and footprint at the bottom of the glass objects.

SUMMARY

According to one embodiment, a spray coating apparatus that applies a coating material onto outer surfaces of glass objects includes a coating material source that includes a coating material. A spray nozzle assembly includes a spray nozzle fluidly connected to the coating material source. The spray nozzle is arranged and configured to direct the coating material in a first direction toward the glass object and provide an overspray amount of the coating material by the glass object such that the overspray amount bypasses a non-line of sight area of the glass object. A turn nozzle assembly includes a turn nozzle fluidly connected to a pressurized gas source. The turn nozzle is arranged and configured to direct pressurized gas in a second direction different than the first direction toward the non-line of sight area of the glass package to redirect the coating material onto the non-line of sight area.

According to another embodiment, a method of coating a glass package with a coating material using a spray coating apparatus is provided. The method includes gripping the glass package with a clamping device. The coating material is directed onto an outer surface of the glass package using a spray nozzle of a spray nozzle assembly. The spray nozzle is arranged and configured to direct the coating material in a first direction toward the glass package and provide an overspray amount of the coating material that bypasses a non-line of sight area of the glass package. The overspray amount of the coating material bypassing the glass package is redirected toward the non-line of sight area of the glass package using a turn nozzle of a turn nozzle assembly. The turn nozzle is arranged and configured to direct pressurized gas in a second direction different than the first direction toward the non-line of sight area of the glass package changing direction and momentum of coating material toward the non-line of sight area.

Additional features and advantages of the glass articles and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1 is a schematic illustration of a portion of a spray coating apparatus including a turn nozzle assembly, according to one or more embodiments shown and described herein;

FIG. 2 is a schematic illustration of a glass object for use in a coating process using the spray coating apparatus of FIG. 1, according to one or more embodiments shown and described herein;

DETAILED DESCRIPTION

Embodiments described herein are generally directed to spray coating apparatuses that are used to apply a coating material onto an outer surfaces of an object, such as a glass package or a pharmaceutical container. The spray coating apparatuses include a coating material source comprising a coating material. A spray nozzle assembly includes a spray nozzle that is fluidly connected to the coating material source. The spray nozzle is arranged and configured to direct the coating material in a first direction toward the glass object and provide an overspray amount of the coating material that misses the glass object. A turn nozzle assembly includes a turn nozzle that is fluidly connected to a pressurized gas source. The turn nozzle is arranged and configured to direct pressurized gas in a second direction different than the first direction toward a non-line of sight area of the glass object to redirect the overspray amount of the coating material.

Figure 1:
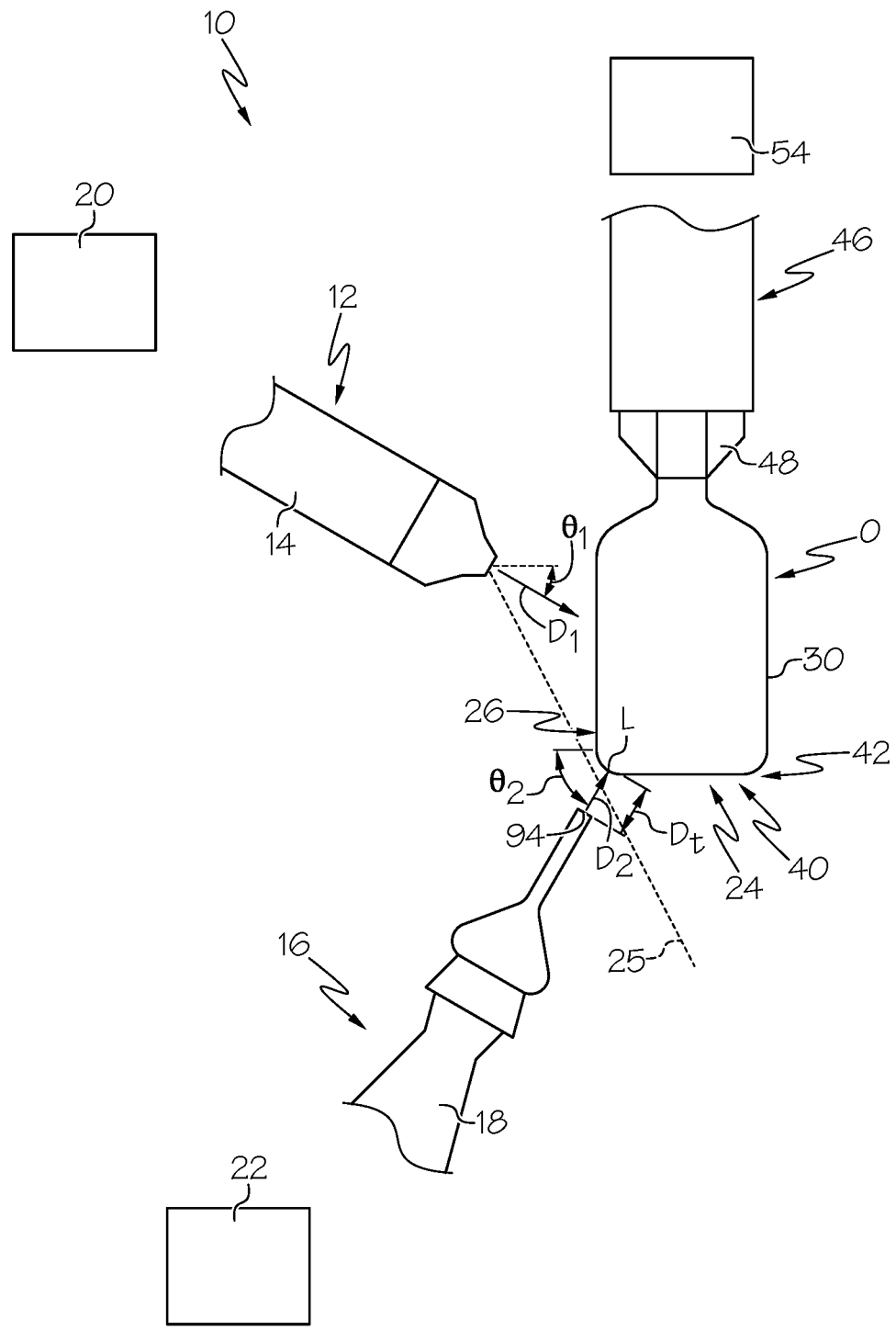

Referring to FIG. 1, a portion of a spray coating apparatus 10 includes a spray nozzle assembly 12 including a spray nozzle 14 and a turn nozzle assembly 16 including a turn nozzle 18. The spray nozzle assembly 12 is fluidly connected to a coating material source 20 that contains a coating material and is arranged to direct the coating material in a first direction $D_1$ toward a glass object O. In some embodiments, the spray nozzle 14 may be an airless spray nozzle. The spray nozzle 14 may be configured to provide a desired amount and distribution of droplets per part area to provide a uniform coating at a selected amount of liquid per part. The turn nozzle 18 is fluidly connected to a pressurized gas source 22 that contains a pressurized gas and is arranged to direct the pressurized gas in a second direction $D_2$ different than the first direction $D_1$ toward a non-line of sight area 24 of the glass object O. As used herein, the term "non-line of sight area" refers to an area of the glass object O that is not directly accessible to the spray nozzle 14. In the illustrated example, the non-line of sight area 24 faces away from the spray nozzle and an overspray amount of the coating material from the spray nozzle 14, represented by line 25, bypasses or misses the glass object O.

Figure 2:
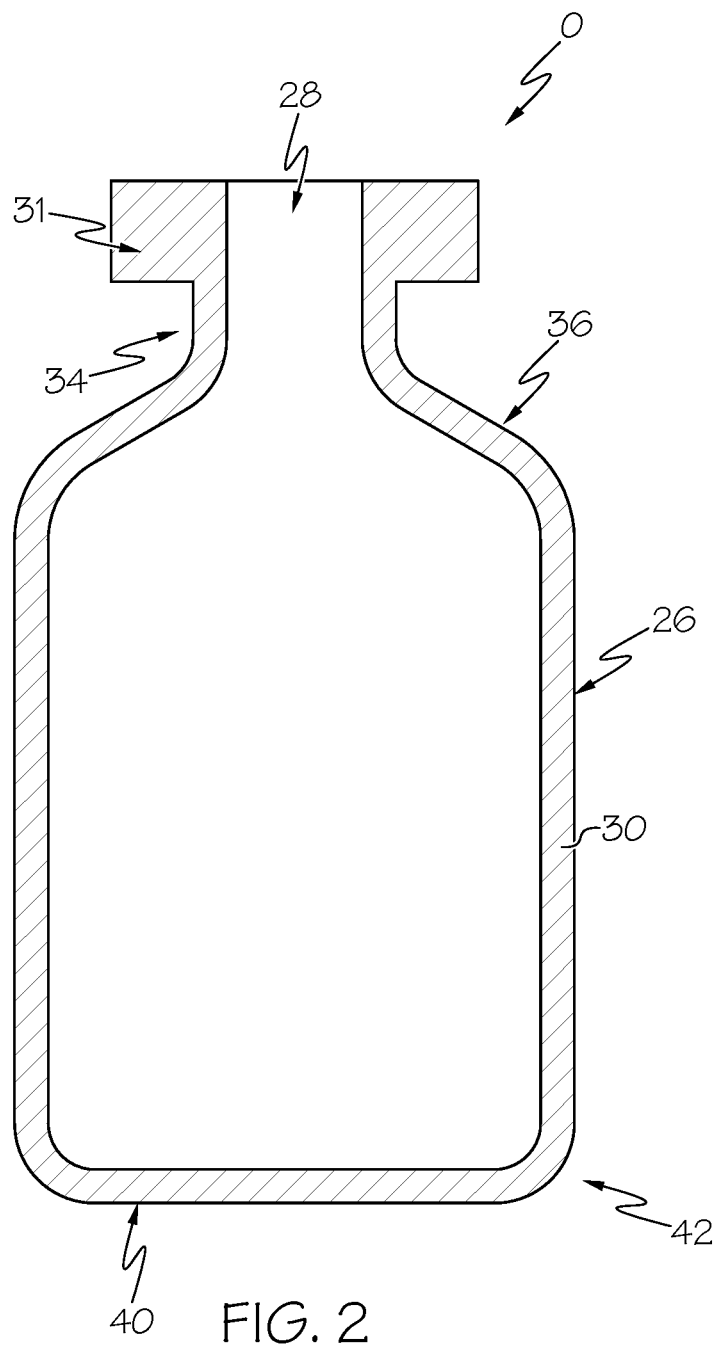

Referring briefly to FIG. 2, the glass object O is illustrated in isolation and includes a body 26. The body 26 is the portion of the glass object O having the greatest internal volume for containing a majority of the contents of the glass object O. The body 26 is formed by a sidewall 30 that extends from a shoulder 36 to a heel 42 of the glass object O. An opening 28 of the glass object O provides access to the internal volume of the body 26. In some embodiments, the glass object O may include a flange 31 that provides a sealing surface at the opening 28 for a cap or other closure for providing an air and liquid-tight seal thereagainst. The flange 31 may be referred to as a finish of the glass object O. Other closure structures can be provided at the flange 31, such as threads for engaging a threaded cap or closure. Between the flange 31 and the body 26 are a neck 34 and the shoulder 36. The neck 34 may have an outer diameter (or width) that is less than the flange 31 and the body 26. An inner diameter of the neck 34 may be substantially the same is the diameter of the opening 28. The shoulder 36 provides an outward transition from the neck 34 to the body 26. The shoulder 36 may have a generally curved transition from the neck 34 to the body 26 to avoid providing an edge. At an opposite end of the body 26 is a bottom 40. The heel 42 provides an inward transition from the body 26 to the bottom 40. The heel 42 may also have a generally curved transition from the body 26 to the bottom 40 to avoid providing an edge.

Referring back to FIG. 1, the glass object O is held adjacent both the spray nozzle 14 and the turn nozzle 18 by a gripping device 46. The gripping device 46 may include gripping fingers 48 that are used to grip the glass object O. In the illustrated example, the glass object O is a pharmaceutical vial and the gripping device 46 grips and holds the glass object O at the flange 31. In this way, the gripping device 46 can both grip the glass object O and cover the opening 28 during a coating operation to thereby prevent coating material from entering the interior of the container.

The gripping device 46 holds the glass object O in a generally vertical orientation such that the sidewall 30 extends in a straight, vertical direction like a cylinder and the bottom 40 extends generally parallel with the floor. While a straight sidewall 30 is illustrated any other suitable sidewall shapes may be used, such as rounded, stepped, ribbed, etc. The coating material is sprayed onto the glass object O by the spray nozzle 14 in the direction $D_1$. The directions $D_1$ and $D_2$ can be determined by a line passing through a geometric center the associated nozzle orifice and perpendicular to a plane containing the nozzle tip opening. As can be seen, the spray nozzle 14 is oriented along a generally downward slope, pointing toward the sidewall 30 providing a spray direction angle $\theta_1$ from horizontal of between about 30 degrees and about 65 degrees, such that the overspray amount 25 of the coating material misses the glass object O. The gas (e.g., air, nitrogen, etc.) is directed onto the glass object O by the turn nozzle 18 in the direction $D_2$. As can be seen, the turn nozzle 18 is oriented along a generally upward slope, pointing generally toward the heel 42 and the bottom 40 providing a jet direction angle $\theta_2$ of between about 45 degrees and about 65 degrees. Due to the orientation of the glass object O, the heel 42 and bottom 40 may be referred to as the non-line of sight area 24 of the glass object O.

Any suitable spray and jet direction angles may be selected based on desired and/or known spray characteristics and shape and orientation of the glass object O during a coating procedure. In the illustrated example, the gripping device 46 is operatively connected to a motor 54 that is used to rotate the glass object O at a high velocity during the coating process to improve uniformity of the coating material applied to the glass object O. Uniformity of the coating material across exterior surfaces of the glass object O including the shoulder 36, body 26, heel 42 and bottom 40 is a consideration in determining the spray characteristics of the coating material and the jet characteristics of the gas. In this regard, the turn nozzle 18 uses the pressurized gas to redirect an amount of overspray of the coating material. As used herein, the term "overspray amount" refers to an amount of coating material which misses the glass object O. The orientation and jet characteristics of the turn nozzle 18 are selected to turn the overspray amount 25 back toward the heel 42 and spread over the bottom 40. The orientation and jet characteristics of the turn nozzle 18 may also be selected to turn a portion of the coating material that migrates down the sidewall 30 of the glass object O toward and onto the heel 42 and bottom 40.

In a high speed or high volume manufacturing environment, deposition of the coating material on the turn nozzle 18 can be a concern. Deposition of the coating material on the turn nozzle 18 can occur through direct impingement of the overspray on the turn nozzle 18 or through indirect deposition and entrainment of suspended droplets of the coating material. Droplets of the coating material are suspended as a result of Bernouli's principle in that high speed airflow through the turn nozzle 18 creates a low pressure outside the turn nozzle that creates the low pressure that leads to the entrainment of the droplets. Over time, the buildup on the turn nozzle 18 can become substantial enough to affect performance by causing a small deflection of the jet flow, which over the operating distance, can shift and misplace the impingement location of the jet nozzle on the glass object O from a desired set point. Small departures (e.g., 10 mm or less) from the desired set point can adversely affect coating performance on the heel 42 and bottom 40 (i.e., under-turned) areas of the glass object O. To this end, the turn nozzle 18 may be provided with a shield or shroud which is described in further detail below.

Figure 3:
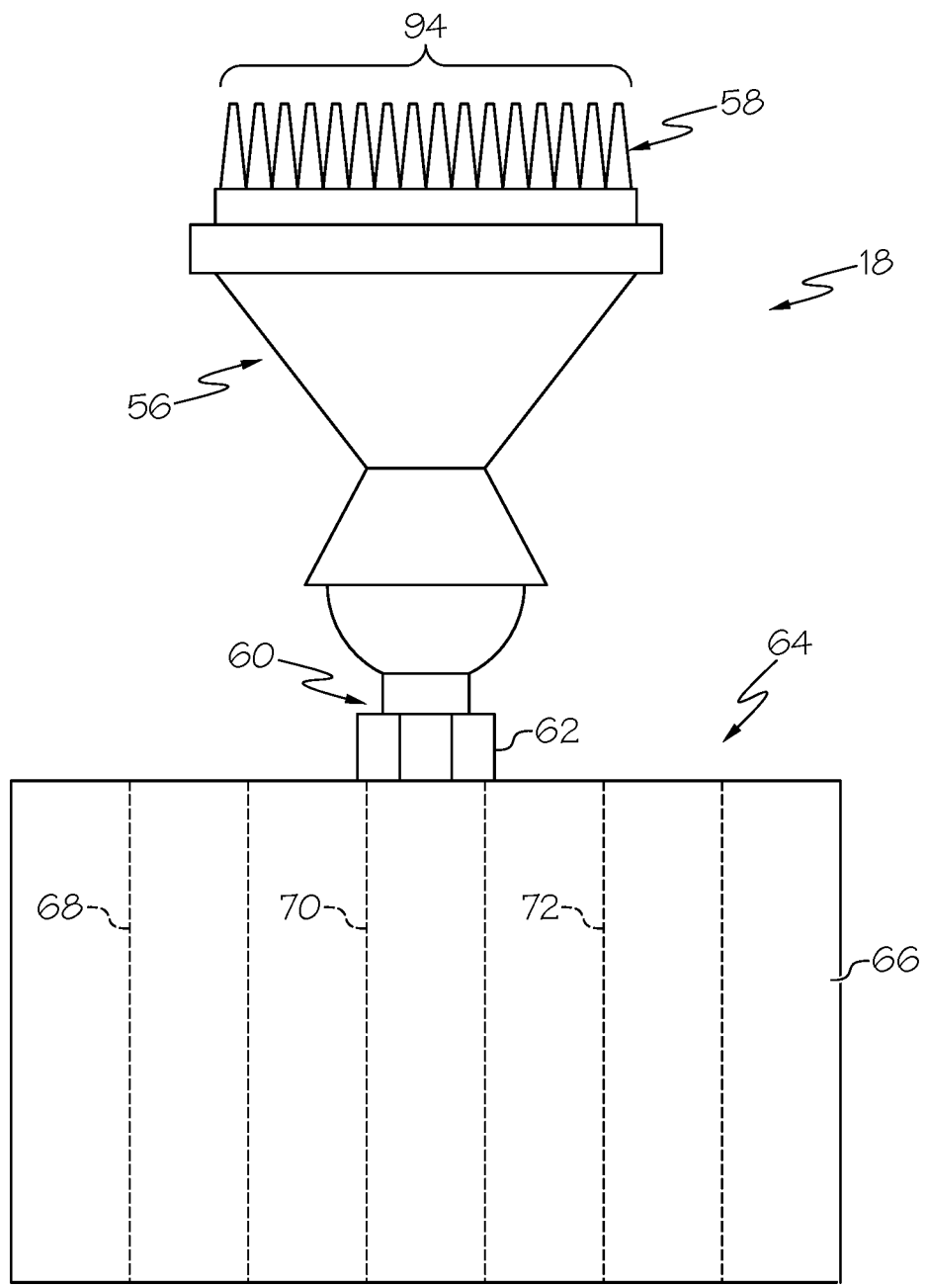
FIG. 3 is a schematic illustration of a turn nozzle for use in the spray coating apparatus of FIG. 1, according to one or more embodiments shown and described herein.

Referring to FIG. 3, the turn nozzle 18 is illustrated in isolation. The turn nozzle 18 includes a nozzle body 56 and multiple side-by-side sub-nozzles 58 that are each in fluid communication with the single nozzle body 56 providing an array of the sub-nozzles 58 that extends in a width-wise direction of the turn nozzle 18. In the illustrated example, there are 16 sub-nozzles 58; however, there may be greater than or less than 16 sub-nozzles. For example, there may be two sub-nozzles or more, such as five sub-nozzles or more, such as 10 sub-nozzles or more such as 15 sub-nozzles or more, such as 20 sub-nozzles or more, such as 30 sub-nozzles or more, such as between five and 25 sub-nozzles. The number of sub-nozzles may depend on, at least in part, sizes and shapes of the glass objects and coating material characteristics.

The turn nozzle 18 further includes a connector portion 60 that connects to a connector 62 of a manifold 64. The manifold 64 includes a body 66 having multiple passageways 68, 70 and 72 that extend therethrough. Passageway 70 is an air delivery passageway that is in fluid communication with the connector 62 for delivering the pressurized air to the turn nozzle 18. Passageways 68 and 72 are gas purge passageways that are in fluid communication with a pressurized air source (or other gas source) for providing purge air therethrough. While two gas purge passageways 68 and 72 are shown, there may be one or more than two gas purge passageways.

Figure 4:
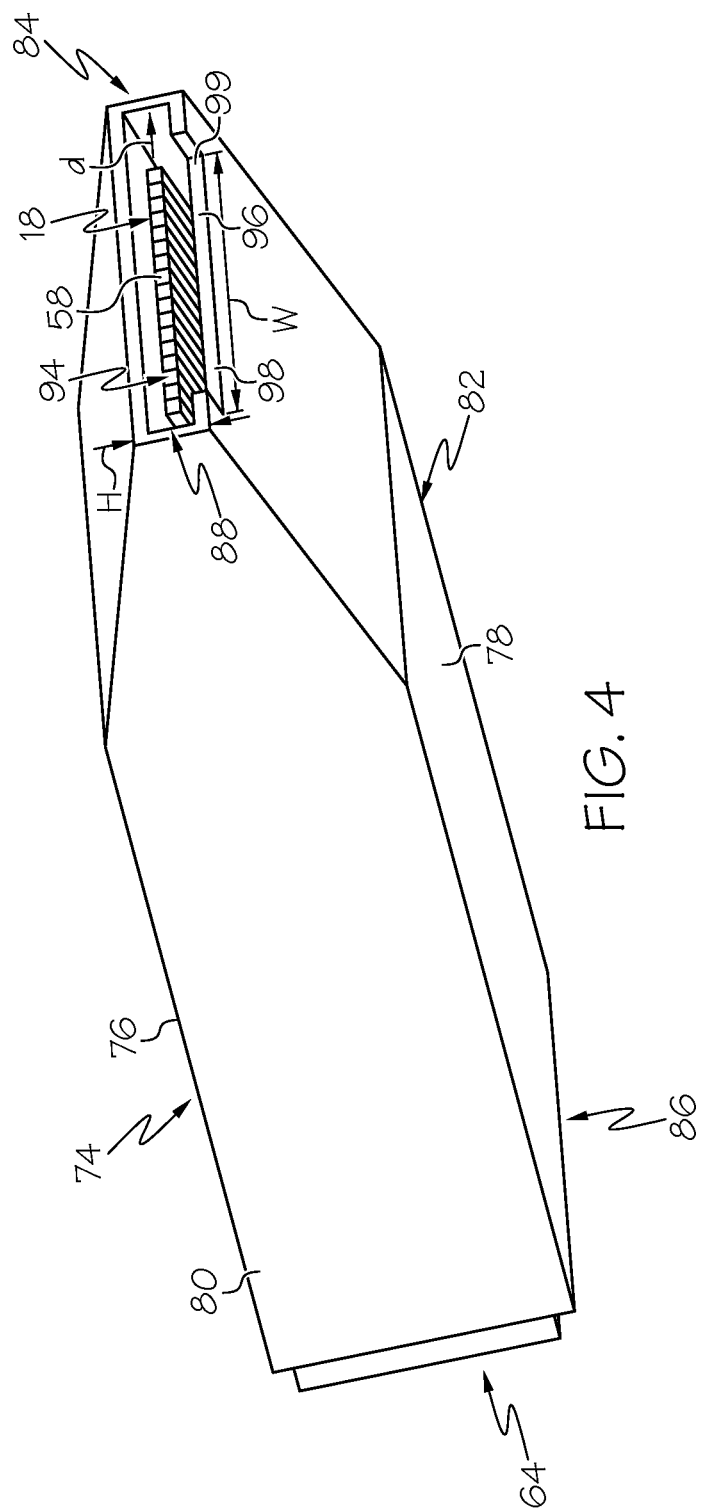
FIG. 4 is a schematic illustration of a turn nozzle assembly including a shroud that covers the turn nozzle of FIG. 3, according to one or more embodiments shown and described herein.

Referring to FIGS. 3 and 4, the manifold 64 may be shaped to correspond to a cross-sectional shape of the shroud 74 that partially envelops the turn nozzle 18. The shroud 74 includes a top 76, a bottom 78, sides 80 and 82, a nozzle end 84 and a manifold end 86. The manifold 64 is engaged with the manifold end 86 of the shroud 74 and the turn nozzle 18 extends outward therefrom toward the nozzle end 84. The nozzle end 84 has a nozzle opening 88 that is elongated in the widthwise direction to correspond to the shape of the array of sub-nozzles 58. As can best be seen by FIG. 4, the nozzle end 84 tapers inward toward the nozzle opening 88. The shroud 74 provides both a structural shield that shields the turn nozzle 18 from falling coating material and an enclosure or internal volume through which purge air can be directed from the one or both of the gas purge passageways 68 and 70 to provide an air shield that repels the droplets of coating material.

Two interrelated design considerations for the turn nozzle assembly 16 are the dimensions of the nozzle opening 88 and the recess depth of tips 90 of the sub-nozzles 58 relative to the nozzle opening 88. It may be desirable to minimize the size of the nozzle opening an amount that does not affect the mean and turbulent flow characteristics of the turn nozzle 18 air jet. This is because a small area between the nozzle opening 88 and the core jet of the turn nozzle 18 results in increased speed of the purge air from the gas purge passageways 68 and 72 (FIG. 3), which can increase the effectiveness of repelling incoming droplets of coating material. On the other hand, the speed of the purge air should be less than the air jet from the turn nozzle 18. Otherwise, the air jet direction may be modified, providing an effectively different jet flow than what is intended.

Referring particularly to FIG. 4, the shroud 74 includes the nozzle opening 88 having a width W and a height H. A prototype turn nozzle assembly 16 was tested for a series of 5,000 sprays. Based on these observations, a nozzle opening 88 was selected that closely matched the overall tip shape of the array of tips of the sub-nozzles 58 hereinafter referred to as the turn nozzle tip 94. Indeed, the size of the nozzle opening 88 may depend on the dimensions of the nozzle tip 94. In the illustrated example, the dimensions for the nozzle opening 88 are 4 mm×42 mm. Also, a cut-out 96 is provided in the bottom 78 of the shroud 74 that terminates at opposite ends 98 and 99 inboard of the sides 80 and 82. The cut-out 96 may be, for example, between one millimeter and three millimeters in depth and between 20 mm and 40 mm in width. The cut-out 96 allows additional coating material to fall from the nozzle opening 88 rather than being entrained within the enclosure and potentially being deposited on the nozzle tip 94.

Regarding the recess depth of the turn nozzle tip 94 from the nozzle opening 88, it has been found that a reduced distance of the turn nozzle tip 94 from the nozzle opening 88 is desired for providing a desired jet direction while increasing the recess depth can further remove the turn nozzle tip 94 from falling coating material. Thus, it may be desired to provide some limited recess depth d. For example, a suitable recess depth d may be between about one millimeter and about five millimeters. However, the recess depth d may vary depending on the particular turn nozzle tip dimensions, flow rates and shroud configuration.

Other exemplary turn nozzle assembly 16 considerations include jet impingement location, turn nozzle distance to the glass object, and jet flow rate. Referring again to FIG. 1, the jet impingement location L can be located along a radius from a center of the bottom 40. The jet impingement location L can be generally determined by the intersection of the jet direction $D_2$ with the glass object O. Because the turn nozzle 18 is used to redirect the coating material bypassing the sidewall 30 and heel 42 and/or flowing down the sidewall 30 around the heel 42 and over the bottom 40, it may be desirable to select a jet impingement location L that is located between the heel 42 and the geometric center of the bottom 40. As one example, for a bottom 40 having a radius of ten millimeters, a suitable impingement location L may be between one millimeter to seven millimeters, such as five millimeters (i.e., ½ R) from the center. Depending on the spray coverage, some air may impinge upon the sidewall 30, bottom 40 and heel 42.

The turn nozzle distance $D_t$ is the distance from the nozzle tip 94 to the glass object O. A suitable turn nozzle distance $D_t$ may be selected from ten millimeters to 30 mm, such as between 15 mm and 25 mm, such as about 20 mm. The turn nozzle distance $D_t$ may depend on any number of factors such as glass object size and shape and the coating material used. Another factor that may affect the turn nozzle distance $D_t$ is the jet flow rate. A suitable jet flow rate may, for example, be selected between one cubic foot per minute and five cubic feet per minute, such as about three cubic feet per minute.

Details on various coating materials, such as polyimide-based coatings, may be found in U.S. Patent Application Publication No. 2013/0171456, filed Feb. 28, 2013, and entitled "Glass Articles with Low-Friction Coatings," U.S. Patent Application Publication No. 2013/0224407, filed Feb. 28, 2013, and entitled "Glass Articles with Low-Friction Coatings," U.S. Patent Application Publication No. 2014/0001076, filed Mar. 14, 2013, and entitled "Delamination Resistant Glass Containers with Heat-Tolerant Coatings," U.S. Patent Application Publication No. 2014/0001143, filed Jun. 28, 2013, and entitled "Delamination Resistant Glass Containers with Heat-Tolerant Coatings," U.S. Patent Application Publication No. 2014/0151320, filed Nov. 8, 2013, and entitled "Glass Containers with Delamination Resistance and Improved Damage Tolerance," U.S. Patent Application Publication No. 2014/0151321, filed Nov. 8, 2013, and entitled "Glass Containers with Improved Strength and Improved Damage Tolerance," U.S. Patent Application Publication No. 2014/0151370, filed Nov. 8, 2013, and entitled "Strengthened Glass Containers Resistant to Delamination and Damage," U.S. Patent Application Publication No. 2015/0329416, filed Jul. 29, 2015, and entitled "Glass Articles with Low-Friction Coatings," U.S. Patent Application Publication No. 2015/0360999, filed Jul. 29, 2015, and entitled "Glass Articles with Low-Friction Coatings," U.S. Pat. No. 9,034,442, filed Oct. 11, 2013, and entitled "Strengthened Borosilicate Glass Containers with Improved Damage Tolerance," and U.S. Pat. No. 9,428,302, filed Oct. 18, 2013, and entitled "Delamination Resistant Glass Containers with Heat-Tolerant Coatings," each of which are hereby incorporated by reference in its entirety.

Figure 5:
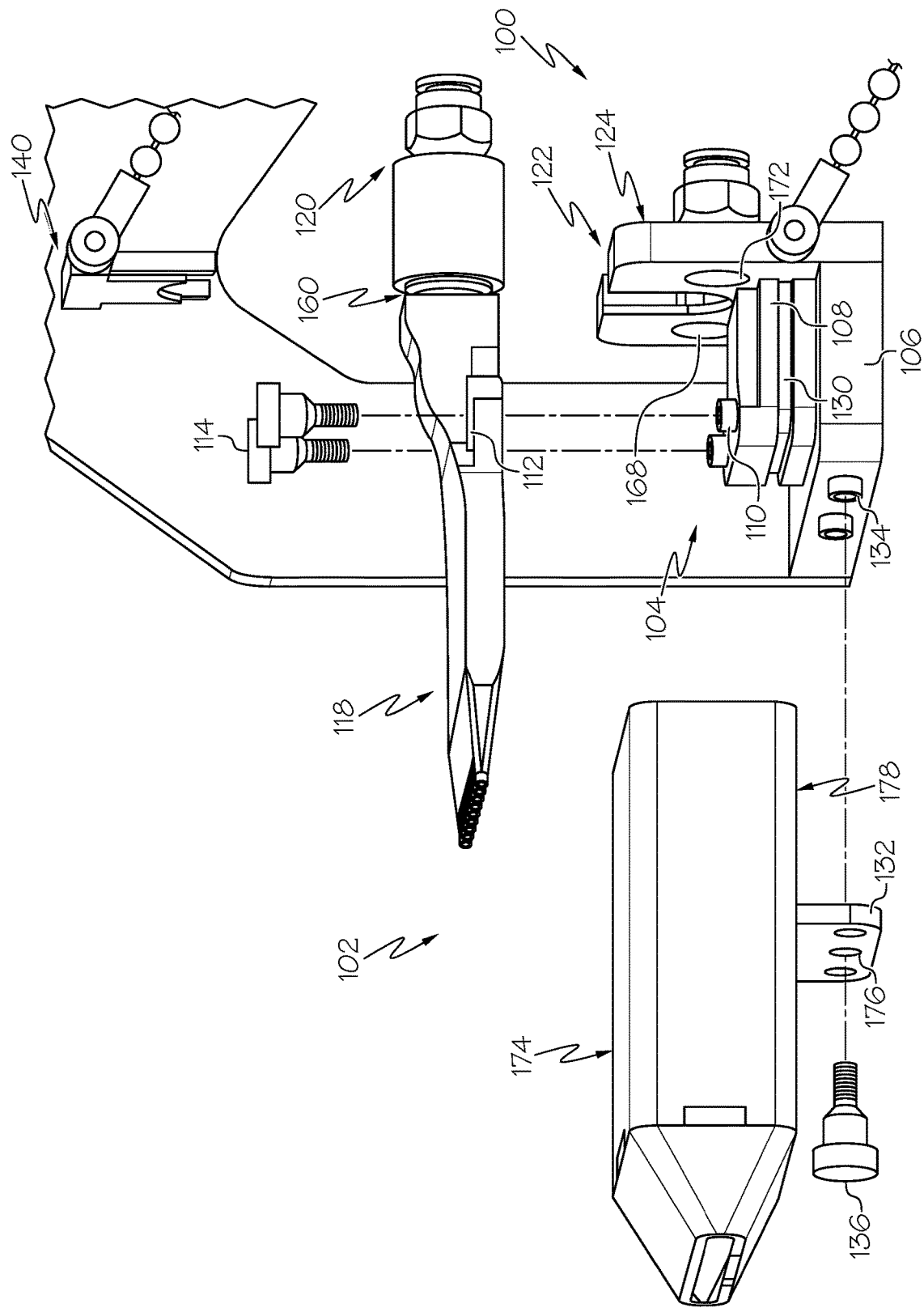
FIG. 5 is an exploded view of a portion of a spray coating apparatus using a turn nozzle assembly, according to one or more embodiments shown and described herein.
Figure 6:
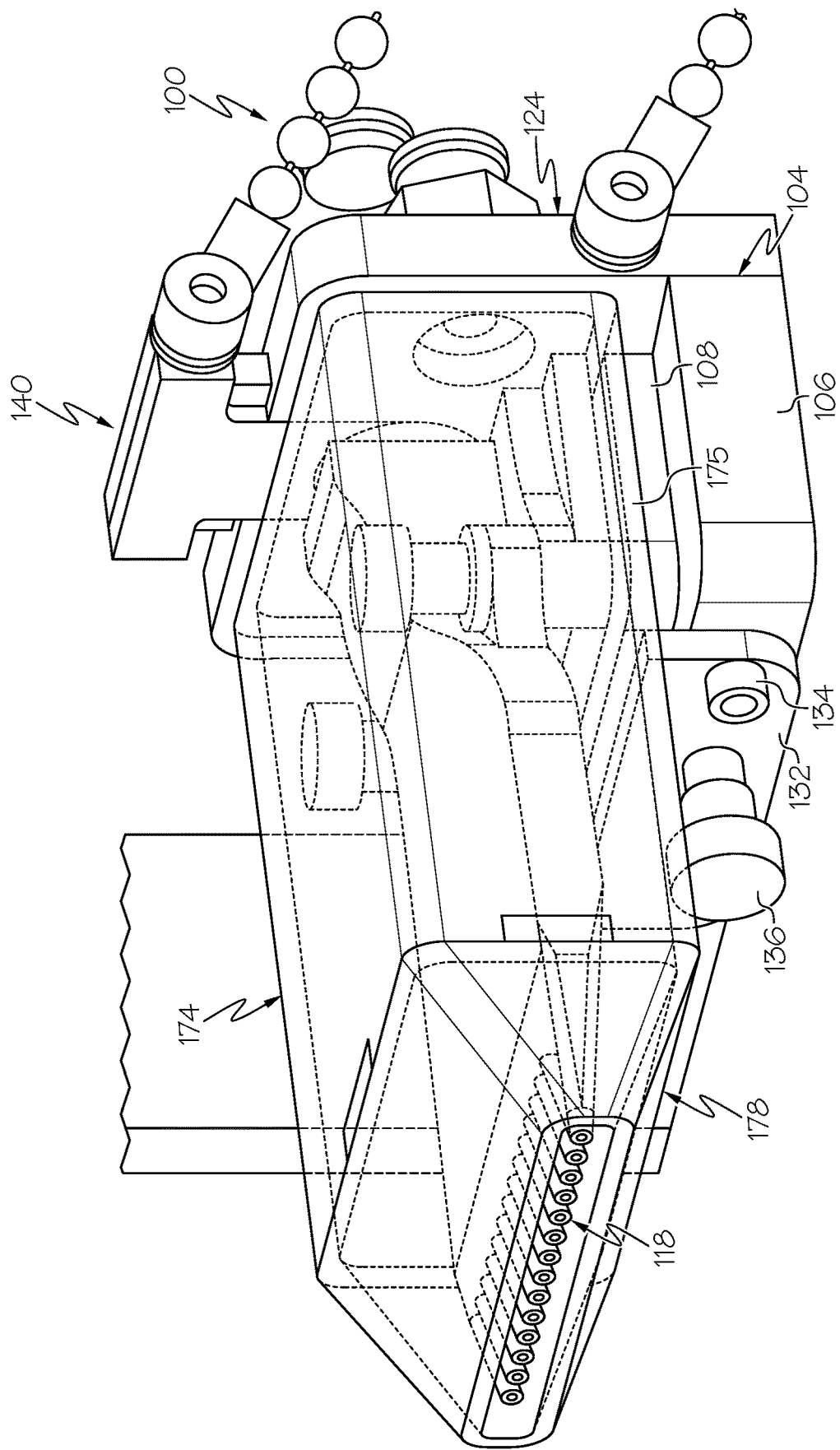
FIG. 6 is an assembled view of the portion of the spray coating apparatus of FIG. 5, according to one or more embodiments shown and described herein.

Referring to FIGS. 5 and 6, a quick coupling assembly 100 for a turn nozzle assembly 102 is illustrated. The coupling assembly 100 includes a turn nozzle mounting structure 104 that is mounted to a support 106. The turn nozzle mounting structure 104 includes a base 108 upon which a turn nozzle 118 is mounted. The base 108 includes one or more alignment pins 110 that mate with alignment openings 112 at opposite sides of the turn nozzle 118. Thumb screws 114 or other suitable connectors may be used to mount into the pins 110. A connector portion 160 of the turn nozzle 118 connects to connector 120 that is received within a slot 122 of manifold 124. The manifold 124 includes air purge passageways 168 and 172 therethrough for delivering pressurized air into the enclosure provided by shroud 174, as discussed above.

Once the turn nozzle 118 is in place on the mounting structure 104, the shroud 174 may be slid over the turn nozzle 118. The shroud 174 may have an opening 175 through its bottom 178 that the bottom 178 can be slid through a slot 130 provided by the base 108. The shroud 174 may further include a mounting flange 132 having mounting openings 176 that receive dowel pins 134. Again, thumb screws 136 or other suitable fasteners may be used to secure the shroud 174 around the turn nozzle 118. A removable wall section 140 may be used to secure the connector 120 within the slot 122 of the manifold 124 and seal off the enclosure of the shroud 174.

Figure 7:
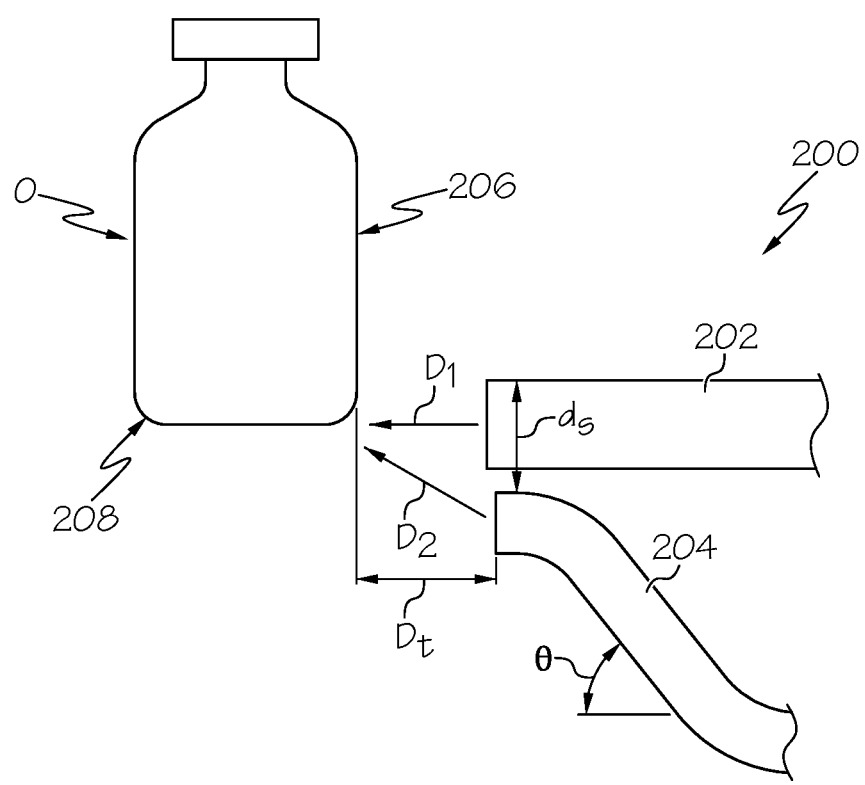
FIG. 7 is a schematic illustration of a portion of a turn nozzle assembly, according to one or more embodiments shown and described herein.

Particular turn nozzle arrangements with a linear array of sub-nozzles are discussed above; however, other turn nozzle configurations are contemplated. For example, referring to FIG. 7, another turn nozzle 200 includes a first sub-nozzle 202 and a second sub-nozzle 204. In this example, the first sub-nozzle 202 is located above the second sub-nozzle 204. The first sub-nozzle 202 is arranged generally horizontal (e.g., with a downward tilt of 0.5 degrees or less) and provides a first jet of a gas, such as air or nitrogen, in a first direction $D_1$ that is perpendicular to a body 206 of glass object O and parallel to horizontal. The second sub-nozzle 204 extends at an angle to horizontal and provides a second jet of gas in a second direction $D_2$ that is offset at an angle θ (e.g., between about 25 degrees and about 45 degrees, such as 33.5 degrees) from the first direction $D_1$. A distance $d_s$ between a top of the first sub-nozzle 202 to a top of the second sub-nozzle 204 may be between four millimeters and seven millimeters, such as 4.5 mm.

A distance $D_t$ of the sub-nozzles 202 and 204 from the glass object O may be between six millimeters and 18 mm, such as about 12 mm. A distance from heel 208 to a top of the first sub-nozzle 202 may be between zero and three millimeters. Referring briefly to FIG. 8, tips 210 and 212 of the first sub-nozzle 202 and second sub-nozzle 204 may have a non-circular geometry, such as elliptical having a longer width than height. As one example, with w may be about 7.5 mm and height h may be about 4 mm. Pressure to the first and second sub-nozzles 202 and 204 may be between 30 and 50 psi with gas flow rates of 150 standard cubic feet per hour or less. The distances and other dimensions and flow rates may vary depending on factors, such as nozzle geometry, coating material used, gas flow rate, etc.

The above-described apparatuses and methods provide a turn nozzle that is used to redirect liquid coating material bypassing and/or sprayed onto a sidewall around a corner and along an underside of a glass object in order to coat the underside of the glass object. Redirecting the coating material, as opposed to directing two sprays of coating material, can reduce the amount of coating material used to coat the glass object and can reduce or even eliminate visible marks of overlapped coating material layers on the glass object. Redirecting the coating material can also use less coating material and can simplify the coating process by eliminating a liquid spray nozzle. Use of a shroud can protect the turn nozzle from contamination thereby decreasing nozzle maintenance time and frequency and can avoid disruption of turn nozzle setup even after multiple maintenance cycles.

Embodiments can be described with reference to the following numbered clauses, with preferred features laid out in the dependent clauses:

Clause 1: A spray coating apparatus that applies a coating material onto outer surfaces of glass objects, comprising: a coating material source comprising a coating material;

a spray nozzle assembly comprising a spray nozzle fluidly connected to the coating material source, the spray nozzle arranged and configured to direct the coating material in a first direction toward the glass object and provide an overspray amount of the coating material by the glass object such that the overspray amount bypasses a non-line of sight area of the glass object; and a turn nozzle assembly comprising a turn nozzle fluidly connected to a pressurized gas source, the turn nozzle arranged and configured to direct pressurized gas in a second direction different than the first direction toward the non-line of sight area of the glass package to redirect the coating material onto the non-line of sight area.

Clause 2: The spray coating apparatus of clause 1, wherein the turn nozzle assembly further comprises a shroud forming an enclosure that partially envelops the turn nozzle.

Clause 3: The spray coating apparatus of clause 2, wherein the shroud has an outlet opening at an end of the shroud, wherein a tip of the turn nozzle is offset from the outlet opening within the enclosure.

Clause 4: The spray coating apparatus of clause 3, wherein the turn nozzle comprises a tip having a width that is greater than a height of the tip.

Clause 5: The spray coating apparatus of clause 4, wherein the outlet opening has a width that is greater than a height of the outlet opening.

Clause 6: The spray coating apparatus of clause 3 or 4, wherein the shroud is engaged with a manifold that includes a gas inlet through which pressurized gas is directed through the enclosure.

Clause 7: The spray coating apparatus of any of clauses 1-6 further comprising a clamping device that is configured to clamp onto the glass package and hold the glass package alongside the turn nozzle, the glass object being a vial and the under-turned area comprising a heel providing a transition between a bottom of the vial and a side of the vial.

Clause 8: The spray coating apparatus of any of clauses 1-7, wherein the turn nozzle directs the pressurized gas in the second direction at a flow rate of between one cubic foot per minute and five cubic feet per minute.

Clause 9: The spray coating apparatus of any of clauses 1-8, wherein the turn nozzle comprises an array of sub-nozzles.

Clause 10: The spray coating apparatus of any of clauses 1-9, wherein the turn nozzle is a first turn nozzle, the apparatus further comprising a second turn nozzle arranged and configured to direct pressurized air in a third direction different than the first direction toward the non-line of sight area of the glass package.

Clause 11: A method of coating a glass package with a coating material using a spray coating apparatus, the method comprising: gripping the glass package with a clamping device; directing the coating material onto an outer surface of the glass package using a spray nozzle of a spray nozzle assembly, the spray nozzle arranged and configured to direct the coating material in a first direction toward the glass package and provide an overspray amount of the coating material that bypasses a non-line of sight area of the glass package; and redirecting the overspray amount of the coating material toward the non-line of sight area of the glass package using a turn nozzle of a turn nozzle assembly, the turn nozzle arranged and configured to direct pressurized gas in a second direction different than the first direction toward the non-line of sight area of the glass package changing direction and momentum of coating material toward the non-line of sight area.

Clause 12: The method of clause 11 further comprising spinning the glass package during the step of re-directing some coating material.

Clause 13: The method of clause 11 or 12 further comprising enclosing the turn nozzle in a shroud that partially envelops the turn nozzle thereby shielding the turn nozzle from coating material.

Clause 14: The method of clause 13, wherein the shroud has an outlet opening at an end of the shroud, wherein a tip of the heel turn nozzle is offset from the outlet opening within the enclosure.

Clause 15: The method of clause 14, wherein the turn nozzle comprises a tip having a width that is greater than a height of the tip.

Clause 16: The method of clause 15, wherein the outlet opening has a width that is greater than a height of the outlet opening.

Clause 17: The method of any of clauses 14-16 further comprising directing pressurized gas through the enclosure.

Clause 18: The method of any of clauses 11-17 wherein, the glass package is a vial and the under-turned portion being a heel providing a transition between a bottom of the vial and a side of the vial.

Clause 19: The method of clause 18 further comprising a motor operatively connected to the clamping device that spins the vial as the coating material is applied using the spray nozzle.

Clause 20: The method of any of clauses 11-19, wherein the turn nozzle is a first turn nozzle, the apparatus further comprising a second turn nozzle arranged and configured to direct pressurized air in a third direction different than the first direction toward the non-line of sight area of the glass package.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A spray coating apparatus that applies a coating material onto outer surfaces of glass objects, the glass objects comprising a glass package, the spray coating apparatus comprising:
   a coating material source comprising a coating material;
   a spray nozzle assembly comprising a spray nozzle fluidly connected to the coating material source, the spray nozzle arranged and configured to direct the coating material in a first direction toward the glass package and provide an overspray amount of the coating material by the glass package such that the overspray amount bypasses a non-line of sight area of the glass package that faces away from the spray nozzle; and
   a turn nozzle assembly comprising a turn nozzle fluidly connected to a pressurized gas source, the turn nozzle arranged and configured to direct pressurized gas in a second direction different than the first direction toward the non-line of sight area of the glass package to redirect the coating material onto the non-line of sight area.

2. The spray coating apparatus of claim 1, wherein the turn nozzle assembly further comprises a shroud forming an enclosure that partially envelops the turn nozzle.

3. The spray coating apparatus of claim 2, wherein the shroud has an outlet opening at an end of the shroud, wherein a tip of the turn nozzle is offset from the outlet opening within the enclosure.

4. The spray coating apparatus of claim 3, wherein the turn nozzle comprises a tip having a width that is greater than a height of the tip.

5. The spray coating apparatus of claim 4, wherein the outlet opening has a width that is greater than a height of the outlet opening.

6. The spray coating apparatus of claim 3, wherein the shroud is engaged with a manifold that includes a gas inlet through which pressurized gas is directed through the enclosure.

7. The spray coating apparatus of claim 1 further comprising a clamping device that is configured to clamp onto the glass package and hold the glass package alongside the turn nozzle, the glass package being a vial and the under-turned area comprising a heel providing a transition between a bottom of the vial and a side of the vial.

8. The spray coating apparatus of claim 1, wherein the turn nozzle directs the pressurized gas in the second direction at a flow rate of between one cubic foot per minute and five cubic feet per minute.

9. The spray coating apparatus of claim 1, wherein the turn nozzle comprises an array of sub-nozzles.

10. The spray coating apparatus of claim 1, wherein the turn nozzle is a first turn nozzle, the apparatus further comprising a second turn nozzle arranged and configured to direct pressurized air in a third direction different than the first direction toward the non-line of sight area of the glass package.

* * * * *